United States Patent [19]

Mahler

[11] 4,213,950
[45] Jul. 22, 1980

[54] PROCESS FOR PREPARING AMORPHOUS PARTICULATE POLY(ALUMINO-SILICATE)

[75] Inventor: Walter Mahler, Wilmington, Del.

[73] Assignee: E. I. Du Pont de Nemours and Company, Wilmington, Del.

[21] Appl. No.: 972,422

[22] Filed: Dec. 22, 1978

[51] Int. Cl.$^2$ ............... C01B 33/26; C01B 33/28
[52] U.S. Cl. ................................ 423/329; 423/328
[58] Field of Search .................... 423/328–330; 106/288 B; 252/455 R, 455 Z

[56] References Cited

U.S. PATENT DOCUMENTS

| | | | |
|---|---|---|---|
| 1,642,880 | 9/1927 | Kriegsheim | 423/329 |
| 1,949,360 | 2/1934 | Schorger | 423/329 |
| 2,278,746 | 4/1942 | Sturgeon | 252/451 |
| 2,315,024 | 3/1943 | Sturgeon | 208/120 |
| 3,310,373 | 3/1967 | Johnson | 423/329 |
| 3,457,191 | 7/1969 | Erickson et al. | 252/455 |
| 3,484,194 | 12/1969 | Hindin et al. | 423/329 |
| 3,650,989 | 3/1972 | Hindin et al. | 252/451 |
| 4,110,522 | 8/1978 | Frielingsdorf et al. | 526/105 |

OTHER PUBLICATIONS

Sotirova et al., "Chemical Abstracts" 79, 68235s (1973).
Fahlke et al., Z. Anorg. AllG. Chem. 347, 82 (1966).

*Primary Examiner*—Edward J. Meros

[57] ABSTRACT

Process for preparing particulate, porous, amorphous water-insoluble poly(alumino-silicate) having a Si/Al ratio of 2:1 to 100:1, of high surface area, and in high yield, by mixing an aqueous solution of an alkali metal aluminate and an aqueous solution of silicic acid, allowing the aluminate and silicic acid in the resultant reaction mixture to polymerize to poly(alumino-silicate), and thereafter removing sufficient water from the reaction mixture to permit recovery of the particulate poly(alumino-silicate) therefrom; and particulate poly(alumino-silicate) prepared thereby.

10 Claims, 5 Drawing Figures

PROCESS FOR PREPARING AMORPHOUS PARTICULATE POLY(ALUMINO-SILICATE)

TECHNICAL FIELD

This invention relates to poly(alumino-silicate) having a desirable combination of physical and chemical properties.

One object of this invention is to provide a process for preparing such a poly(alumino-silicate). Another object is to provide a process for preparing particulate, porous, water-insoluble amorphous poly(alumino-silicate) having a Si/Al gram-atomic ratio of at least 2:1. A further object is to provide a poly(alumino-silicate) that is useful as a catalyst or catalyst component, adsorbent, detergent builder and ion-exchange material. Other objects will become apparent hereinafter.

BACKGROUND ART

Generally, amorphous poly(alumino-silicates) are prepared by mixing aqueous solutions of sodium silicate and sodium aluminate, allowing the resultant mixture to gel, removing water, for example, by freezing to about $-5°$ C. without precipitating solutes contained therein, and then washing out water-soluble compounds, which include substantial amounts of sodium hydroxide, sodium aluminate and sodium silicate. Such soluble residues represent an economic penalty in that the yield of desired product is low and waste disposal costs are high. Moreover, alumino-silicates with Si/Al ratios greater than 4, particularly 10 to 100, are difficult to prepare by this method and, in fact, the art suggests that the Si/Al ratio in the poly(alumino-silicate) product is not dependent on the Si/Al ratio in the reactants.

Also disclosed in the art is the preparation of poly(alumino-silicates) by acidifying a sodium silicate solution until a silica gel is formed, then combining the gel with either an alumina gel or with a sodium aluminate solution. Such poly(alumino-silicates) generally are heterogeneous.

BRIEF DESCRIPTION OF DRAWINGS

The accompanying drawings form a material part of this disclosure.

DISCLOSURE OF THE INVENTION

Figure 1:
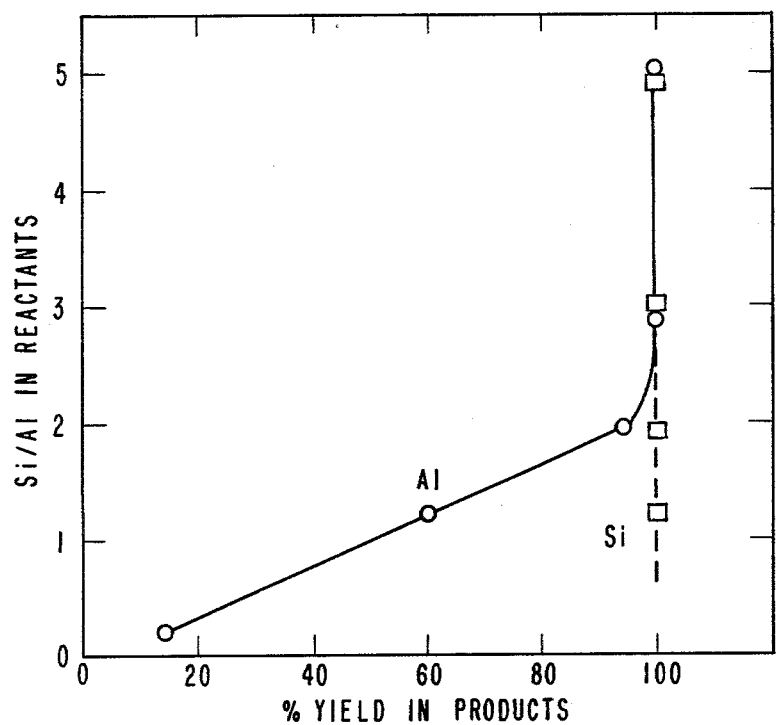
FIG. 1 depicts the relationship between the Si/Al ratio in the reactants and the yield of Al and Si in the desired product, using the process of this invention, a substantially quantitative yield being achieved at a Si/Al ratio, in the reactants, of above about 2.

For further comprehension of the invention, and of the objects and advantages thereof, reference may be made to the following description and to the appended claims in which the various novel features of the invention are more particularly set forth.

This invention resides in a process for preparing particulate, porous, amorphous water-insoluble poly(alumino-silicate) having a Si/Al ratio of 2:1 to 100:1, of high surface area, and in high yield, which process comprises mixing an aqueous solution of an alkali metal aluminate, generally sodium aluminate, and an aqueous solution of silicic acid, allowing the aluminate and silicic acid in the resultant reaction mixture to polymerize to poly(alumino-silicate), and then removing a sufficient amount of water from the reaction mixture to permit recovery of the particulate poly(alumino-silicate) therefrom.

The silicic acid and aluminate solutions should be well stirred and mixed as rapidly as possible to provide maximum uniformity of the mixture. Mixing can be achieved simply by rapidly pouring the two solutions, contained in separate vessels, into a large third vessel, with good agitation. It is preferable, however, to employ a mixing nozzle, preferably a multiple-jet mixing nozzle, similar to those described by A. Weissberger in "Techniques of Organic Chemistry", Vol. VIII, Part II (Interscience, 1963), p. 709, to ensure complete and rapid mixing and to permit use of aqueous solutions which are more concentrated than can be homogeneously mixed, in a batch type operation, because of the rapid increase in viscosity due to the polymerization (and, usually, gelation) which takes place in the mixture.

Known means can be employed to remove water. For example, cooling to $-10$ to $-100°$ C. with concomitant conversion of water to ice, can be employed. If a gel is formed on mixing the aluminate and silicic acid and freezing is to be employed to remove water, the gel can be aged, for example, at room temperature, before freezing to enhance the stability of the ultimate poly(alumino-silicate) particles. Preferably, to remove water, the aforesaid mixture is frozen, after which it can be thawed and the desired product can be recovered therefrom by filtration.

Optionally, and preferably, the aqueous silicic acid solution and/or the aqueous alkali metal aluminate can contain one or more water-soluble compounds, such as a metal or ammonium salt, or an organic compound, provided such compounds are chemically inert to the reactants and the product (of the invention process) and are precipitable from the aqueous reaction mixture at $-10$ to $-100°$ C. Desired water-soluble compounds may also be generated in situ, for example, by adding ammonium hydroxide to the aqueous silicic acid solution or, as in the preparation of silicic acid from alkali metal silicate as described below, by the addition of a mineral acid to the silicate. Less preferably, a water-soluble compound or compounds can be added to the mixture of the aluminate and silicic acid. The presence of such a compound or compounds provides a poly(alumino-silicate) product having significantly increased pore size.

Addition of an ammonium salt to the mixture of the aluminate and silicic acid or, preferably, to the solution of silicic acid before it is mixed with the aluminate, provides a poly(alumino-silicate) of significantly lower alkali metal content as well as increased pore size. In a preferred embodiment, aqueous sodium aluminate and aqueous silicic acid are combined in such amounts that the Si/Al gram-atomic ratio in the mixture is greater than 2:1; the mixture is frozen, then thawed, and the desired product is recovered therefrom by filtration, after which it is washed and dried. In a still more preferred embodiment, an aqueous solution of sodium aluminate and an aqueous solution of silicic acid containing ammonium ions are mixed in such amounts that the Si/Al ratio in the mixture is greater than 2:1 and the $NH_4/Na$ ratio in the mixture is at least 1; the mixture is frozen, then thawed, and the desired product is recovered therefrom by filtration, after which it is washed with water and dried.

The poly(alumino-silicate) products of this invention are useful as catalysts and catalyst components, adsorbents, detergent-builders and ion-exchange materials.

The aqueous alkali metal aluminate solution can be prepared by dissolving in water commercially available granular alkali metal aluminate of approximate formula $M_2O \cdot Al_2O_3 \cdot 3H_2O$, wherein M is an alkali metal, generally sodium.

Silicic acid can be represented, as a hydrated $SiO_2$, by the formula $[Si_3O_5(OH)_2]_n$ wherein n is the degree of polymerization of the silicic acid. Aqueous silicic acid can be prepared from commercially available aqueous alkali metal silicate, for example, sodium silicate, by means of known ion exchange procedures, such as that disclosed in U.S. Pat. No. 2,244,325. Aqueous silicic acid solutions so prepared are of low acidity, usually having a pH of 2 to 4, and are substantially free of metal ions. Freshly prepared silicic acid solutions used in the practice of this invention are true solutions of poly(silicic acid), not appreciably cross-linked, and are distinguishable from colloidal "solutions," suspensions, dispersions and gels. Silicic acid solutions are not generally available commercially and they tend to cross-link and gel on standing.

As mentioned above, the solution of silicic acid used herein can also contain dissolved ammonium ions and/or compounds, such as water-soluble metal salts and organic compounds, provided these additional substances are chemically inert to the reactants and the product of the invention process and are precipitable from the aqueous reaction mixture at $-10°$ to $-100°$ C. Alternatively, but less preferably, such substances can be added to the mixed silicic acid/aluminate-containing solution prior to gelation, if gelation occurs, and/or water removal.

An alternative method of preparing aqueous silicic acid solution for use herein, preferred when a water-soluble salt can be tolerated or is desired as, for example, in the preparation of poly(alumino-silicate) of large pore size, is to add a mineral acid, such as sulfuric acid, to an aqueous solution of commercially available alkali metal silicate, for example, sodium silicate, in such a quantity that the pH of the final solution is about 1 to 9, preferably about 4 to 7. Acidification must be conducted carefully, with stirring, to avoid silica gelation or precipitation. Such neutralization forms a salt, for example, $Na_2SO_4$, in situ, which salt serves as the aforesaid water-soluble inert compound. Such a salt, if desired, can be used in combination with one or more added water-soluble compounds.

The reaction of aqueous sodium aluminate and aqueous silicic acid may be represented by the following equation (product water being omitted):

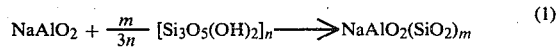
$NaAlO_2 + \frac{m}{3n} [Si_3O_5(OH)_2]_n \longrightarrow NaAlO_2(SiO_2)_m$  (1)

wherein m is the Si/Al combining ratio and n is the degree of polymerization of the silicic acid. When m is at least 2, the poly(alumino-silicate) product is obtained in almost quantitative yield with little or no soluble residue. The relationship between the Si/Al ratio in the reactants and the recovery (yield) of Al and Si, as insoluble poly(alumino-silicate), in the product is shown for the aqueous sodium aluminate/silicic acid reaction in FIG. 1; approximately 100% yields are obtained at Si/Al ratios of at least about 2:1.

Figure 2:
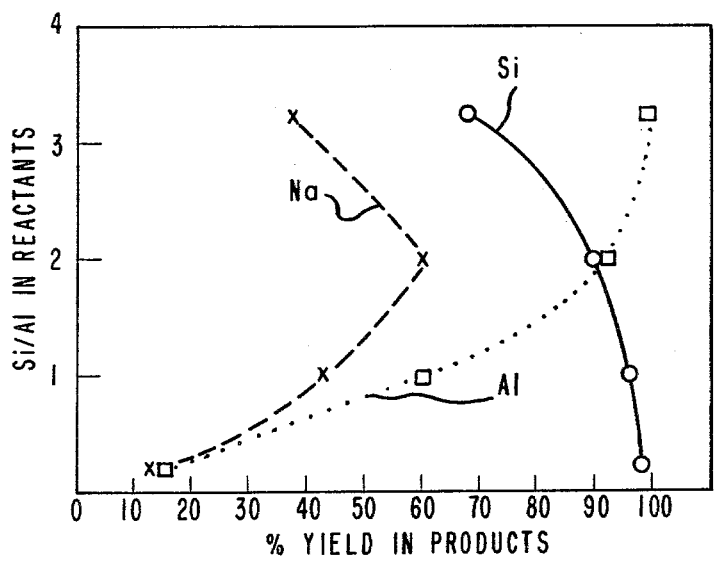
FIG. 2 depicts the analogous relationship using a prior art process employing common commercially available sodium silicate as a reactant.
Figure 3:
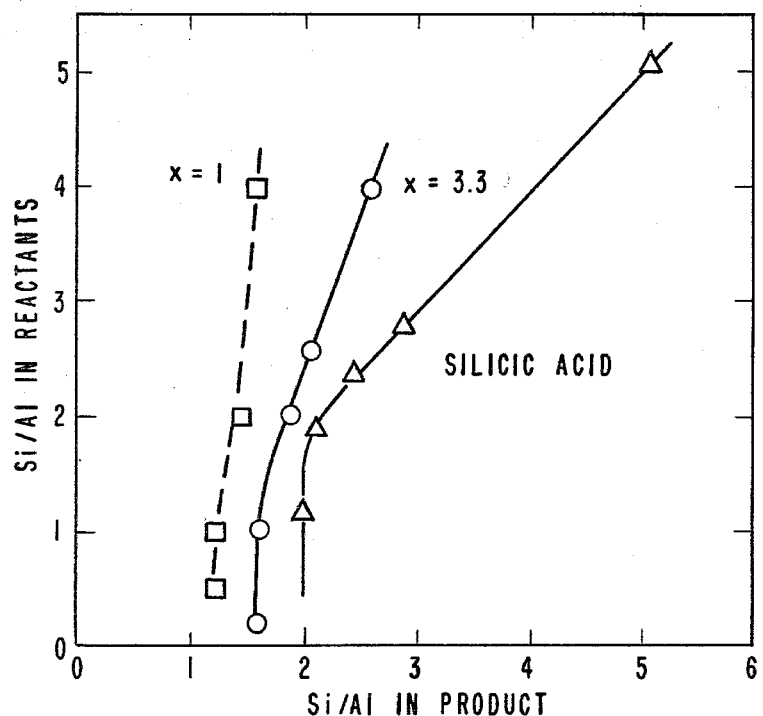
FIG. 3 depicts Si/Al ratios for the products and reactants for prior art processes and for a process included in the instant invention.
Figure 4:
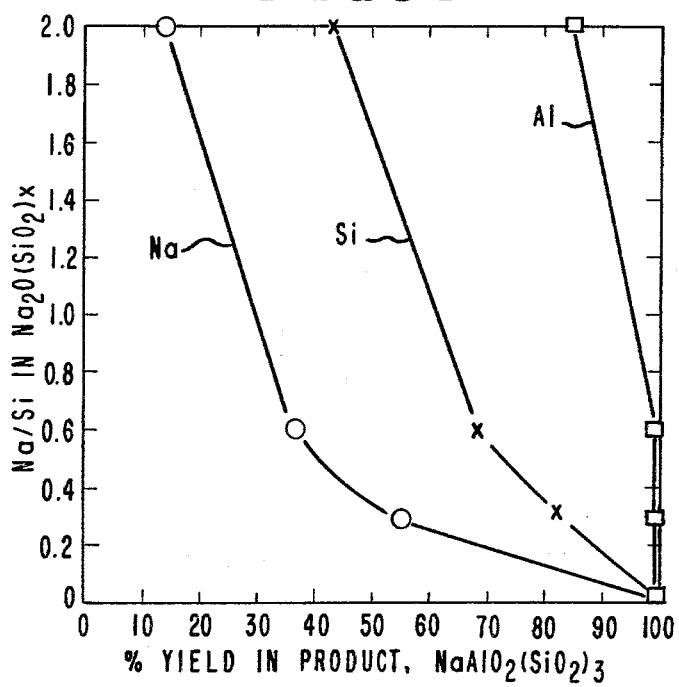
FIG. 4 depicts yields of aluminum, silicon and sodium in the formation of poly(alumino-silicates), at various Na/Si ratios in the sodium silicate which is reacted with sodium aluminate to produce the product shown.

Conventional prior art processes carried out to prepare poly(alumino-silicate) from aqueous sodium aluminate and aqueous sodium silicate can be approximately represented by the equation (water of hydration and product water being omitted):

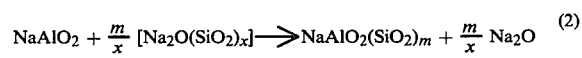
$NaAlO_2 + \frac{m}{x} [Na_2O(SiO_2)_x] \longrightarrow NaAlO_2(SiO_2)_m + \frac{m}{x} Na_2O$  (2)

wherein m is the Si/Al combining ratio and x is a value which, in commercially available sodium silicates, generally is in the range 1 to 4. The sodium(hydr)oxide by-product, that is, sodium oxide as the hydroxide in an aqueous system, remains in solution and causes some aluminum and/or silicon to be retained in solution, as shown in FIG. 2 for $x=3.25$. Moreover, in sharp contrast to the invention process, poly(alumino-silicate) prepared by reacting sodium aluminate and sodium silicate, wherein the Na/Si ratio in the reactants is greater than about 0.3, has a Si/Al ratio substantially below the Si/Al ratio in the reactants. As indicated above, the art suggests that the composition of the product is largely independent of the Si/Al ratio in the reactants. A significant feature of the instant invention resides in the discovery that as the alkali metal content of the alkali metal silicate is reduced, the Si/Al ratio in the product approaches that of the reactants, the two ratios becoming equal in the limiting case of alkali metal aluminate and silicic acid, as shown in FIG. 3. Thus, the Si/Al ratio in the product is the same as the Si/Al ratio in the reactants when the ratio in the reactants is at least about 2:1. Moreover, the recovery of Al and Si in the poly(alumino-silicate) product is quantitative, as discussed above. The quantitative aspect of the process of this invention is reflected in FIG. 4 which depicts the plot of the Na/Si ratio in the reactant $Na_2O(SiO_2)_x$, where x is at least one, and the yield of aluminum, silicon and sodium in the poly(alumino-silicate) product $NaAlO_2(SiO_2)_3$. As shown in FIG. 4, as the Na/Si ratio in the sodium silicate decreases from about 0.3, the yields of aluminum, silicon and sodium in the product rapidly approach 100%.

Aqueous alkali metal aluminate and aqueous silicic acid combine in the invention process to form an alkali metal poly(alumino-silicate), for example, sodium poly(alumino-silicate). It may be desirable to reduce the alkali metal content of the alkali metal poly(alumino-silicate) product to enhance its thermal stability or to permit its conversion to a hydroaluminosilicate having enhanced catalytic performance. The alkali metal content can be reduced, while converting to a hydroaluminosilicate, by washing the alkali metal poly(alumino-silicate) with an acid, but this generally results in loss of product as poly(alumino-silicates) tend to dissolve in acid. Another art-recognized method is to replace alkali metal ion by ammonium ion, by extensively washing with an ammonium salt solution, then heating the resultant ammonium poly(alumino-silicate) to drive off ammonia. However, very extensive washing with an ammonium salt is required to displace the alkali metal.

The addition of an ammonium salt to the alkali metal aluminate/silicic acid mixture, for example, before it is frozen, or, preferably, to the silicic acid solution before it is mixed with the aluminate, in an amount such that the $NH_4/Na$ ratio is at least 1:1, has been found to provide a poly(alumino-silicate) which, after only a brief water wash, has a markedly reduced sodium content, that is, the product has a Na/Al ratio of much less than 1:1. Moreover, the average pore diameter of the product obtained is much enlarged using such a procedure in combination with the freezing and thawing techniques. Control of pore size can also be effected herein by using the aforesaid water-soluble metal salt or organic compound in place of the ammonium compound. In all cases involving control of pore size by the addition of a water-soluble compound, the water-soluble compound must be precipitable from the mixture at $-10$ to $-100°$ C. and it must be chemically inert to the reactants and the product in the poly(alumino-silicate)-forming reaction. The addition of an ammonium salt or other water-soluble precipitable compound to silicic acid-sodium aluminate mixtures, combined with freezing to $-10°$ to $-100°$ C., provides control of poly(alumino-silicate) pore size over the range of about 20 to 220 A at a substantially constant surface area.

Suitable water-soluble inert compounds which are useful herein can be selected from: (i) salts of alkali and alkaline earth metal, ammonium and quaternary ammonium cations and mineral acids, such as sulfuric, hydrochloric and nitric acids, or organic acids, such as formic, acetic, oxalic, citric and thiocyanic acids; and (ii) alkaline or neutral, water-soluble organic compounds. The above list is intended to be representative, not by any means all inclusive or exclusive. Examples of (i) include NaCl, $Na_2SO_4$, $NaNO_3$, $CH_3CO_2Na$, $NH_4NO_3$, $CaCl_2$, $Ca(SCN)_2.4H_2O$ and $Na_2C_2O_4$; examples of (ii) include ethanolamine, triethanolamine, morpholine, sorbitol and sucrose.

The water-soluble precipitable compound (or compounds) can be present in such an amount that the total concentration thereof is up to about 160%, by weight, of the combined weights of silicic acid and aluminate, calculated as $SiO_2$ and $Al_2O_3$.

It is to be understood that the controlled expansion of pore size in poly(alumino-silicate) prepared by the process of this invention, by adding a water-soluble compound which is chemically inert in the poly(alumino-silicate)-forming reaction, does not constitute part of the invention herein but has been found to be a useful expedient for use in conjunction with the instant invention process and, as such, has been discussed hereinabove in this disclosure. As already indicated above, freezing represents a preferred method of removing water after mixing the aluminate solution and the silicic acid solution. If pore size control is to be practiced in conjunction with this invention process, that is, if the benefit of the addition of a water-soluble compound is to be realized, freezing to remove water is essential.

An additional expedient for use in conjunction with the instant invention, particularly when poly(alumino-silicate) containing large pores is desired, is the displacement of water from the product particles, in a final washing step, with a water-soluble organic liquid, such as acetone, having a very low surface tension, followed by the vaporization-removal of the liquid at a temperature of about 100° to 200° C., preferable 110° to 150° C. Sharygin et al., Kinet. Katal. 11 (1), 187 (1970); Russ. J. Phys. Chem., 42 (8), 1124 (1968); and Kolloid Zh., 31 (3), 459 (1969) disclose that the capillary forces resulting from the surface tension of liquid water in contact with the internal surfaces of water-wet siliceous particles prepared by a freezing process cause partial collapse of the porous structure during water removal in the final drying step. They further disclose that the displacement of water from siliceous particles with a water-soluble organic liquid, such as ethanol or diethyl ether, having a low surface tension, followed by vaporization of the liquid at or above its critical temperature, substantially preserves the porous structure of the particles, but that removal of such organic liquids at subcritical temperatures, for example 115° C., actually reduces porosity and pore volume.

A particularly useful embodiment of the present invention process consists of washing the product thereof with acetone and then drying the product, first in air, then at 110° to 150° C. for 1 to 8 hours. Although this temperature is substantially below the critical temperature of acetone (235.5° C.), a highly porous product is obtained (Example 13).

Particulate poly(alumino-silicate) prepared by the process of this invention can, for some uses, be employed directly as prepared. In some cases, it may be desirable to compact the particulate material, using conventional procedures and equipment, to granules or pellets or to subdivide the particulate material, using conventional procedures and equipment, to a finer particle size. It is to be understood that throughout this discussion, the term "poly(alumino-silicate)" is used in a generic sense in that it merely reflects the anionic moiety of the product of the process of the invention. It is well understood by one of ordinary skill in the art that the actual product of the process of this invention contains an electrically neutralizing number of alkali metal and/or ammonium cations, or hydrogen ions.

In the following examples, except for Examples 6 and 7, of specific embodiments of this invention, percentages are by weight. In these examples and elsewhere herein, atomic ratios, for example, Si/Al ratios, are ratios of gram-atoms. Examples 6 and 7 have been included herein for the purposes of comparison with the state of the art and to provide data for inclusion in the figures.

EXAMPLE 1

A. To 10 cc of a 1 M aqueous solution of silicic acid, prepared by passing a commercially available aqueous sodium silicate solution through an ion-exchange column containing a sulfonated polystyrene copolymer in its hydrogen form, were added 5 cc of a 1 M aqueous solution of potassium aluminate. The pH of the resultant mixture was 11.5. A clear gel, indicating formation of potassium poly(alumino-silicate), formed after 4 minutes.

B. To 420 cc of aqueous silicic acid solution (6.6 wt % $SiO_2$), prepared as described in Part A, in a polyethylene dish, was added a solution of 22.3 g of a commercially available sodium aluminate ($Na_2O.Al_2O_3.3H_2O$) dissolved in 180 cc of water. The solutions were mixed rapidly. Gelation occurred almost immediately on mixing. The gel was aged 45 minutes, then frozen by floating the dish on acetone at $-55°$ C. for 1 hour. The frozen gel was thawed and the product sodium poly(alumino-silicate) was filtered off and dried in vacuo at 130° C. Yield, 38.9 g of small thin flakes.

C. A solution of silicic acid in water was prepared from commercially available aqueous sodium silicate by a conventional ion exchange procedure, such as by the method disclosed in U.S. Pat. No. 2,244,325, in an approximate concentration of one mole of $SiO_2$ per liter. One liter of the silicic acid solution contained in a plastic beaker was mixed with 75 g of commercially available sodium aluminate, of approximate composition $Na_2O.Al_2O_3.3H_2O$, dissolved in 750 ml of water. Gelation occured during mixing. The gelled mixture was frozen at $-78°$ C. by surrounding the plastic beaker with solid carbon dioxide ("Dry Ice"); thereafter, the frozen gel was thawed and the sodium poly(aluminosilicate) product was recovered by filtration. The insoluble product was washed with water and dried in air at 120° C. for 24 hours; the dried product weighed 123 g. Its composition corresponded to $NaAlO_2.(SiO_2)_{2.1}.H_2O$. The filtrate was evaporated by boiling on a hot plate; the residue remaining weighed 7.4 g.

EXAMPLE 2

One liter of aqueous silicic acid solution, prepared as in Example 1C, was mixed with a solution of 45 g of sodium aluminate dissolved in 500 ml of water. This mixture gelled in 2 minutes; the gel was aged for 1 hour at room temperature and then frozen at $-78°$ C. The frozen gel was thawed and the product was recovered by filtration. The recovered portion weighed 89 g, after being dried in air at 120° C. for 24 hours, and had the composition corresponding to $NaAlO_2.(SiO_2)_{2.47}.H_2O$. Evaporation of the filtrate resulted in recovery of 3 g of residue.

EXAMPLE 3

One liter of aqueous silicic acid solution, prepared as in Example 1C, was mixed with a solution of 35 g of sodium aluminate dissolved in 500 ml of water. This mixture gelled after 4 to 5 days at room temperature. The gel was frozen at $-78°$ C. on the 6th day after mixing. It was then thawed and the product was filtered off, washed and dried at 120° C. The recovered product (86 g) had the composition corresponding to $NaAlO_2.(SiO_2)_{2.85}.H_2O$, exhibiting a surface area of 435 $m^2/g$ and an average pore diameter of 29 A. The residue recovered from the filtrate by evaporation weighed 1.6 g.

EXAMPLE 4

One liter of aqueous silicic acid solution, prepared as in Example 1C, was mixed with a solution of 25 g of sodium aluminate dissolved in 250 ml of water by pouring both solutions simultaneously into 200 ml of water. After 10 days, the still ungelled mixture was frozen at $-78°$ C., then thawed and filtered. The recovered solids were dried in air at 120° C.; the dry product weighed 97 g and had a surface area of 573 $m^2/g$; its composition corresponded to $NaAlO_2.(SiO_2)_{5.1}.H_2O$. The residue recovered from the filtrate by evaporation amounted to 1.1 g and consisted substantially of hydrated sodium hydroxide.

A sample of the product $NaAlO_2.(SiO_2)_{5.1}.H_2O$ was tested as a catalyst in the reaction of methanol and ammonia. It showed good catalytic activity in converting these reactants to methyl-, dimethyl-, and trimethylamine.

EXAMPLE 5

One liter of aqueous silicic acid solution, prepared as in Example 1C, was mixed with a solution of 5.5 g of sodium aluminate dissolved in 100 ml of water. The mixture gelled in 15 seconds; the gel was aged for 3 hours and then frozen at $-78°$ C., after which it was thawed. The 60 g of insoluble product recovered by filtration (dried 5 hours at 130° C. in air) had a surface area of 758 $m^2/g$ and an average pore diameter of less than 20 A; its composition corresponded to $NaAlO_2.(SiO_2.H_2O)_{19}$. Evaporation of the filtrate to dryness provided a residue of less than 0.1 g.

EXAMPLE 6

One liter of aqueous silicic acid solution, prepared as in Example 1C, was mixed with 200 ml of aqueous sodium silicate solution (8.5% by wt $Na_2O$ and 28% by wt $SiO_2$) and the resultant mixture was poured quickly into a solution of 55 g of sodium aluminate dissolved in 500 ml of water. The resultant mixture gelled in a few seconds; the gel was aged for 1 hour and frozen at $-78°$ C.; the frozen gel was thawed. The insoluble product recovered by filtration was washed and then dried at 120° C. in air for 24 hours. The dried product weighed 139 g and had a surface area of 289 $m^2/g$, an average pore diameter of 114 A and a pore volume of 0.82 cc/g; it had the composition corresponding to $NaAlO_2.(SiO_2)3.26.H_2O$.

EXAMPLE 7

A solution of 153 ml of concentrated aqueous sodium silicate (density of 1.39 g/cc and containing 8.7% $Na_2O$ and 28.4% $SiO_2$) was diluted with 500 ml of water. The diluted solution and a solution of 27 g of sodium aluminate in 500 ml of water were poured simultaneously into 500 ml of water. The resultant mixture gelled in 6 minutes; the gel was aged for 21 hours and frozen at $-78°$ C., after which the gel was thawed. The insoluble product recovered by filtration was washed and dried at 120° C. for 24 hours. The dried product weighed 60 g and had the composition corresponding to $NaAlO_2.Si-O_2)_2.3H_2O$. The filtrate was evaporated to dryness to yield a residue of 34 g.

EXAMPLE 8

A. An aqueous solution of silicic acid (pH 3.0; 6.6 wt % $SiO_2$) was prepared by the ion-exchange method described in Example 1A. The solution (324 cc) was placed in a dish and 33.3 g of ammonium chloride (100% of the $SiO_2$) were added and dissolved therein. The pH of the silicic acid-$NH_4Cl$ solution was adjusted to 5.0 by adding aqueous ammonia. Thereafter was added rapidly, with stirring, a solution of 34.3 g of sodium aluminate ($Na_2Al_2O_4.3H_2O$) dissolved in 276 cc of water. The resultant mixture gelled on mixing of the solutions. The gelled mixture was aged for 5 minutes and then frozen at $-55°$ C., after which it was thawed. The product which was recovered by filtration was washed with water and dried. Surface area and porosity were determined by the B.E.T. (Brunauer, Emmett and Teller) nitrogen adsorption method. Surface area: 228 $m^2/g$; pore volume: 1.24 cc/g; pore diameter: 217 A.

B. An aqueous stock solution of sodium aluminate was prepared by dissolving 36 g of sodium aluminate in 500 ml of water. 100 ml Portions of this solution (each portion containing the equivalent of 1.52 g or 0.066 g atom of Na) were mixed with 200 ml portions of aqueous silicic acid solution, prepared as in Example 1C, containing various amounts of dissolved ammonium nitrate (as shown in the following table). Each mixture was frozen at −78° C., then thawed and filtered; the recovered product was washed with about 2 liters of water and then dried in air at 120° C. for 24 hours. All the products had a Si/Al ratio of 3.0; other data are reported in the table.

| Product | Amount of $NH_4NO_3$ Added | | | | |
| --- | --- | --- | --- | --- | --- |
| g $NH_4NO_3$ | 0 | 1.6 | 3.2 | 8.0 | 16.0 |
| moles $NH_4$ | 0 | 0.02 | 0.04 | 0.10 | 0.20 |
| Na/Al ratio | 1.0 | 0.78 | 0.51 | 0.18 | .07 |
| Na removed, g atoms | 0 | 0.0145 | 0.032 | 0.054 | 0.061 |
| Surface Area, $m^2/g$ | 341 | 348 | 406 | 519 | 444 |
| Av. Pore Dia., A | <20 | <20 | <20 | 62 | 119 |
| Pore vol, cc/g | | | | 0.80 | 1.32 |
| Bulk Density, g/cc | 0.38 | 0.61 | 0.51 | 0.26 | 0.16 |
| wt % Na | 6.98 | 5.01 | 3.32 | 1.23 | 0.48 |
| mole % $NH_4 \times 10^{-2}$ | 0 | 0.303 | 0.606 | 1.515 | 3.03 |

Figure 5:
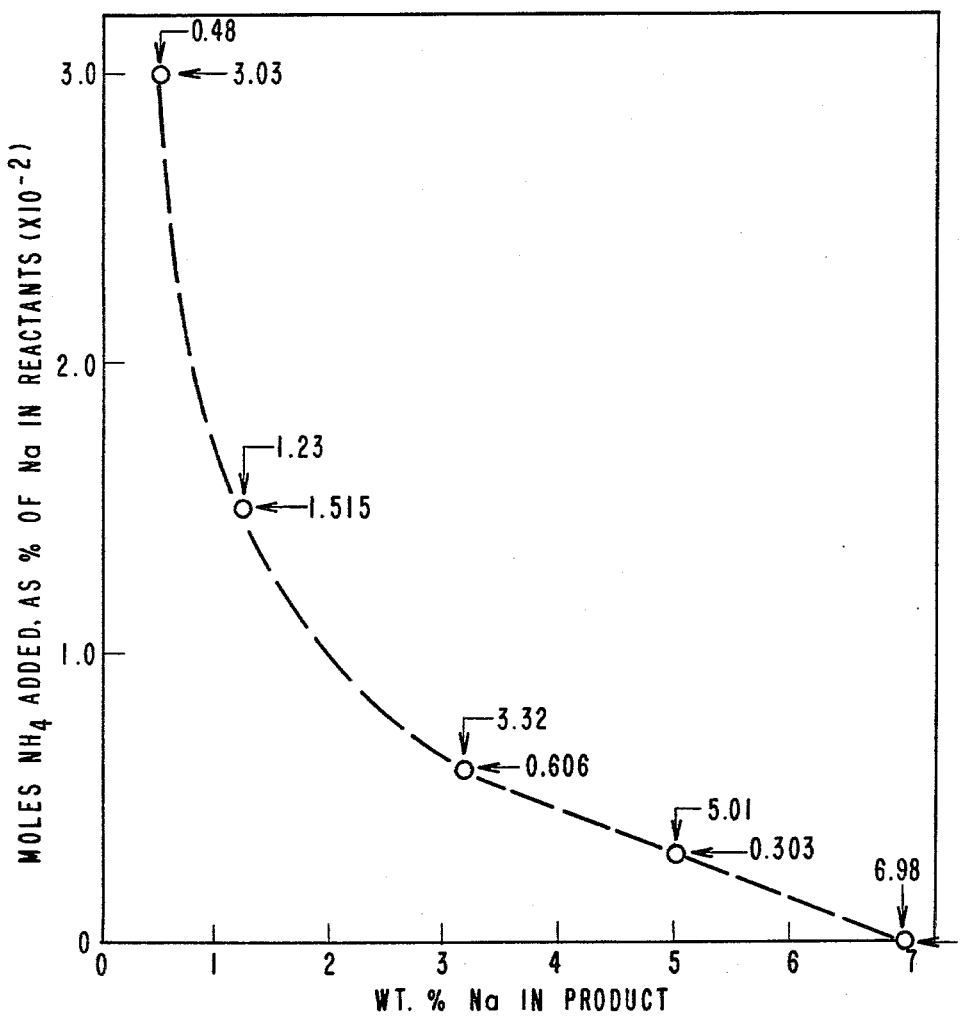
FIG. 5 depicts a plot showing the effect of the addition of $NH_4NO_3$ to silicic acid on the sodium content of the product.

FIG. 5 depicts a plot showing the effect of $NH_4$ on the sodium content of the product.

EXAMPLE 9

Aqueous silicic acid solution (600 ml), prepared as in Example 1C, was mixed rapidly with a solution of 22 g of sodium aluminate dissolved in 200 ml of water. The mixture gelled while it was being mixed. One-half of this mixture was dried in a pan at 210° C. for 24 hours to give 27 g of chips having a surface area of 346 $m^2/g$ and the approximate composition $NaAlO_2.(SiO_2)_{3.5}.(H_2O)_{5.5}$. The other half of the gelled mixture was frozen at −78° C.; the gel was then thawed. The product recovered by filtration was washed with water and then dried at 120° C. for 24 hours. The recovered powder had a surface area of 433 $m^2/g$ and its composition corresponded to $NaAlO_2.(SiO_2)_{3.5}.(H_2O)_{4.5}$.

EXAMPLE 10

Aqueous silicic acid solution (200 ml), prepared as in Example 1C, was mixed with 4 ml of an aqueous solution containing 0.44 g of sodium aluminate. The resultant mixture gelled in two minutes and, after aging for one hour, the gel was frozen; it was then thawed. The product recovered by filtration was washed and then dried at 120° C. for 24 hours; the recovered dried granular powder weighed 12.6 g and had a surface area of 666 $m^2/g$; its composition corresponded to $NaAlO_2.(SiO_2.H_2O)_{52}$. Evaporation of the filtrate to dryness provided a solid residue weighing less than 0.1 g.

EXAMPLE 11

Example 10 was repeated, but only 0.22 g of sodium aluminate in 2 ml of water was used. This resulted in the recovery of 12.6 g of insoluble product having a surface area of 619 $m^2/g$; the composition corresponded to $NaAlO_2.(SiO_2)_{88}.(H_2O)_{58}$. Evaporation of the filtrate to dryness provided a solid residue weighing less than 0.1 g.

EXAMPLE 12

Aqueous silicic acid and aqueous sodium aluminate soluions were mixed in the same amounts as in Example 3, but the mixture was frozen within one minute of mixing and before gelation. Subsequent treatment was carried out as described in Example 3. The recovered product had a surface area of 409 $m^2/g$; its composition corresponded to $NaAlO_2.(SiO_2.H_2O)_3$. The residue obtained by evaporation of the filtrate weighed 1.5 g.

EXAMPLE 13

To 500 ml of an aqueous solution of silicic acid (pH 3.0; 6.0 wt % $SiO_2$) prepared by the ion exchange method of Example 1A were added 60 g of $NH_4NO_3$; this solution was then combined with a solution of 18 g of $Na_2O.Al_2O_3.3H_2O$ in 165 ml of $H_2O$. The gelled admixture was aged for 10 minutes and then frozen at −78° C.; after thawing, the product was recovered by filtration, washed with water, then with acetone, air dried and then heated to 120° C. for 4 hours. The product (white flakes) had a bulk density of 0.10 g/cc, a surface area of 484 $m^2/g$, an average pore diameter of 130 A, and a pore volume of 1.58 cc/g.

BEST MODE FOR CARRYING OUT THE INVENTION

The best mode for carrying out this invention is described by Examples 8, 9, 12 and 13.

INDUSTRIAL APPLICABILITY

The industrial applicability of the process of this invention is demonstrated by all the examples herein.

I claim:

1. Improved process for preparing particulate, porous, amorphous water-insoluble poly(alumino-silicate) of high surface area by mixing an aqueous solution of an alkali metal aluminate and an aqueous solution of a silicon-containing compound, the improvement comprising using silicic acid as the silicon-containing compound and $MAlO_2$, wherein M is alkali metal, as the alkali metal aluminate, in such amounts that the Si/Al ratio provided by the silicic acid and $MAlO_2$ is 2:1 to 100:1, allowing the $MAlO_2$ and silicic acid in the resultant reaction mixture to polymerize to poly(alumino-silicate), and thereafter removing sufficient water from the reaction mixture to permit recovery therefrom, in high yield, of particulate poly(alumino-silicate) having a Si/Al ratio which is substantially the same as the Si/Al ratio provided by the silicic acid and $MAlO_2$ employed in the formation of the reaction mixture.

2. Process of claim 1 wherein the silicic acid is hydrated silicic acid of the formula $[Si_3O_5(OH)_2]_n$ wherein n is the degree of polymerization of the silicic acid.

3. Process of claim 1 wherein the reaction mixture is cooled to a temperature of −10° to −100° C. to remove water.

4. Process of claim 1 wherein the reaction mixture forms a gel.

5. Process of claim 4 wherein the gel is aged at room temperature and then cooled to −10° to −100° C.

6. Process of claim 3 wherein the aqueous silicic acid solution or the reaction mixture contains a water-soluble compound.

7. Process of claim 6 wherein the water-soluble compound is a salt of an alkali or alkaline earth metal, ammonium or quaternary ammonium cation and a mineral acid anion.

8. Process of claim 7 wherein the mineral acid is sulfuric, hydrochloric or nitric acid.

9. Process of claim 1 wherein the alkali metal aluminate is sodium aluminate.

10. Process of claim 6 wherein the water-soluble compound is an ammonium salt, the alkali metal aluminate is sodium aluminate, and the $NH_4/Na$ ratio in the reaction mixture is at least 1:1.

* * * * *